INVENTOR.
Edwin J. Douglas
ECKHOFF & SLICK
ATTORNEYS

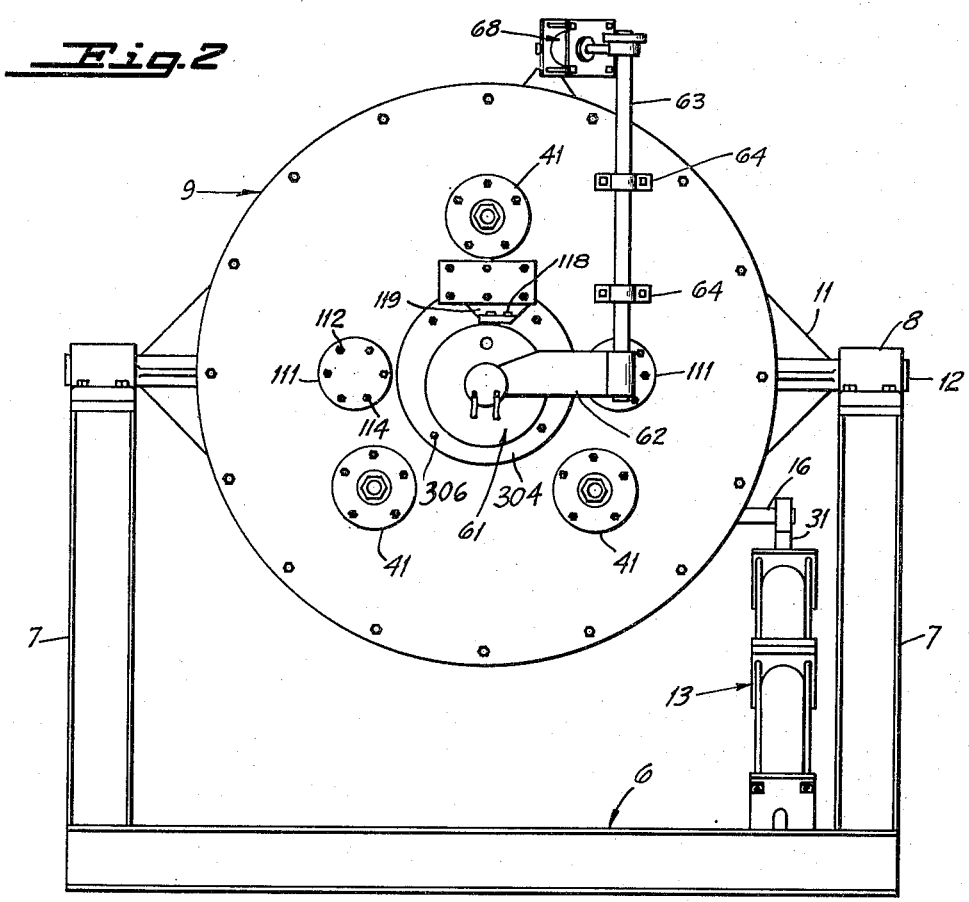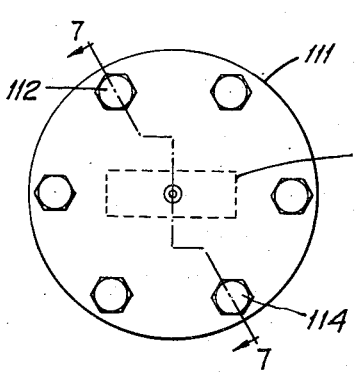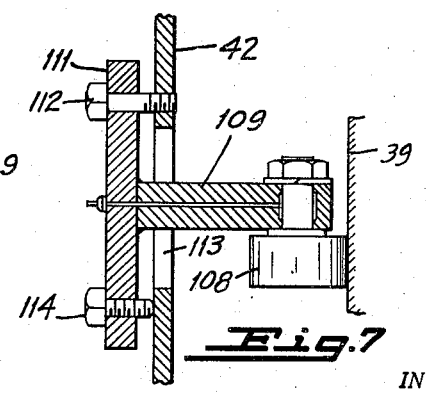

INVENTOR.
Edwin J. Douglas

ECKHOFF & SLICK
ATTORNEYS

June 14, 1955  E. J. DOUGLAS  2,710,423
APPARATUS FOR THE PREPARATION OF FERTILIZER MATERIAL
Filed Aug. 25, 1953  8 Sheets-Sheet 4
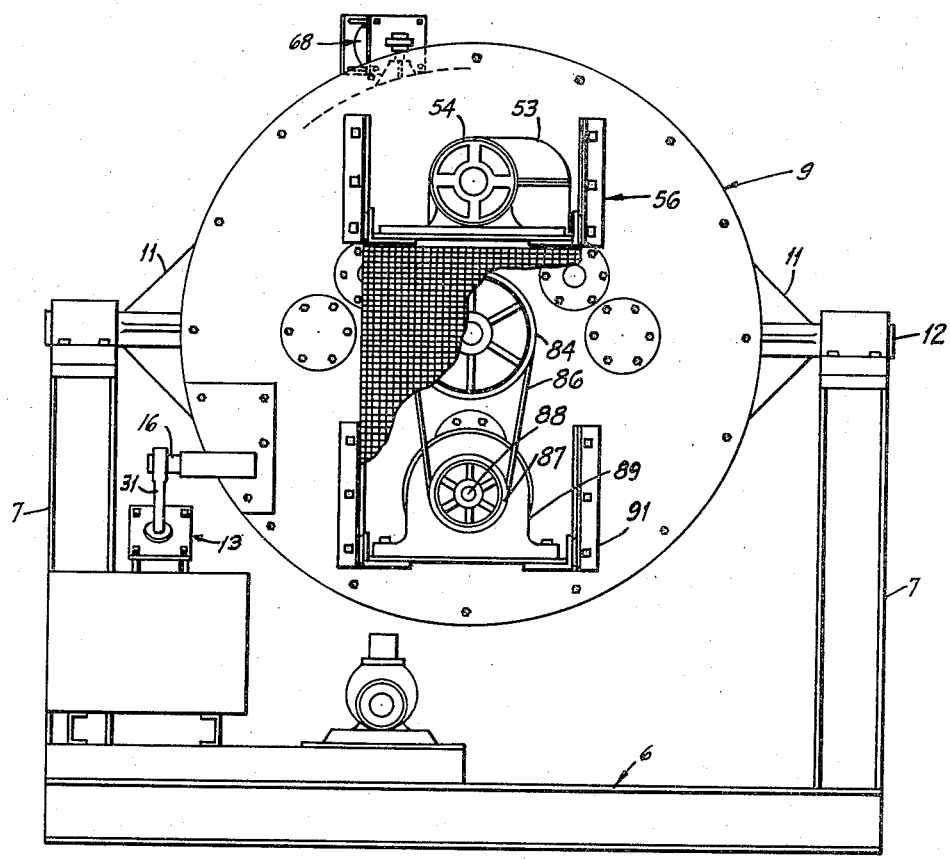
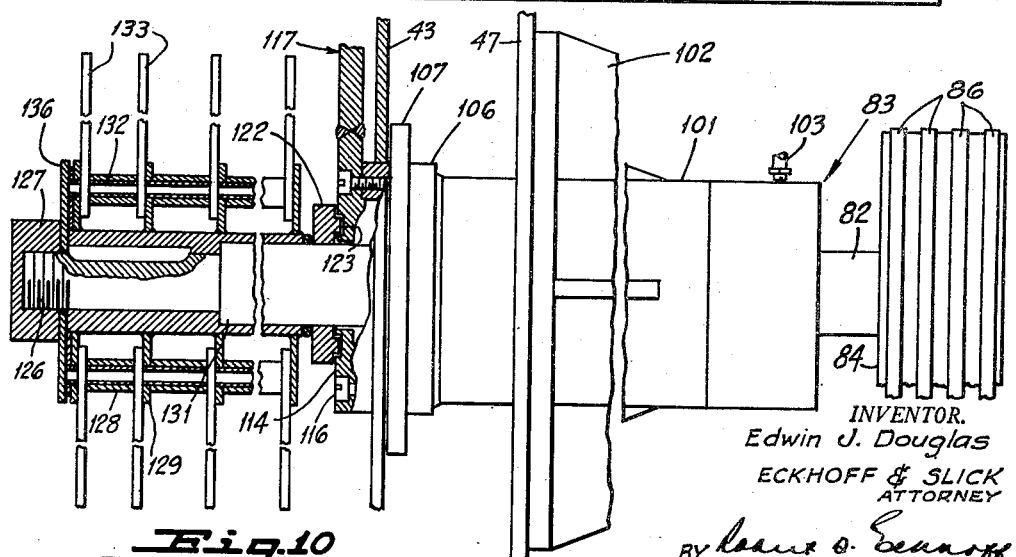
INVENTOR.
Edwin J. Douglas
ECKHOFF & SLICK
ATTORNEY
BY
A MEMBER OF THE FIRM

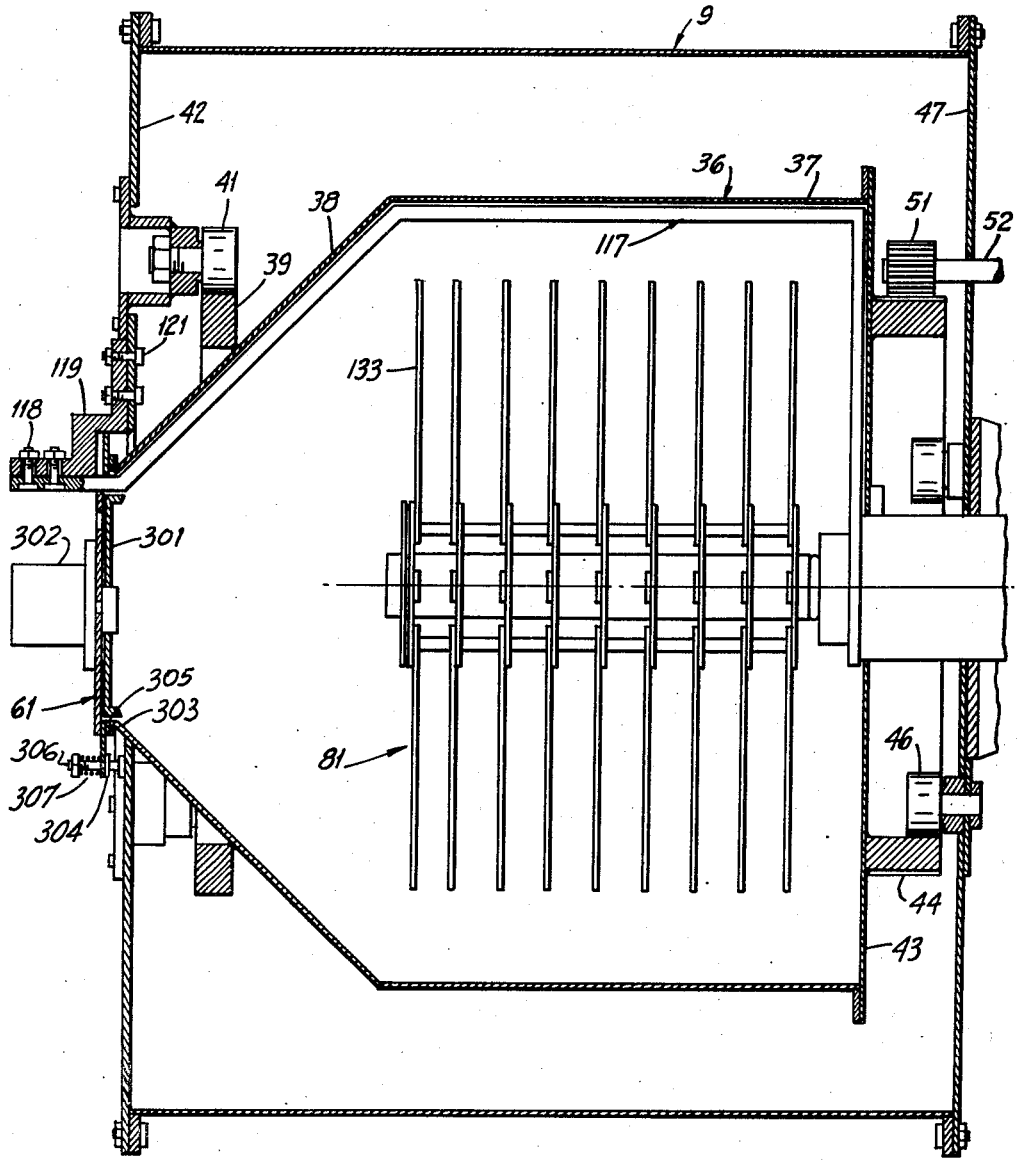

June 14, 1955  E. J. DOUGLAS  2,710,423
APPARATUS FOR THE PREPARATION OF FERTILIZER MATERIAL
Filed Aug. 25, 1953  8 Sheets-Sheet 6

INVENTOR.
Edwin J. Douglas
ECKHOFF & SLICK
ATTORNEYS
BY
A MEMBER OF THE FIRM

June 14, 1955 E. J. DOUGLAS 2,710,423
APPARATUS FOR THE PREPARATION OF FERTILIZER MATERIAL
Filed Aug. 25, 1953 8 Sheets-Sheet 7

INVENTOR.
Edwin J. Douglas
ECKHOFF & SLICK
ATTORNEYS
BY
A MEMBER OF THE FIRM

June 14, 1955 E. J. DOUGLAS 2,710,423
APPARATUS FOR THE PREPARATION OF FERTILIZER MATERIAL
Filed Aug. 25, 1953 8 Sheets-Sheet 8

INVENTOR.
Edwin J. Douglas
ECKHOFF & SLICK
ATTORNEYS
BY
A MEMBER OF THE FIRM

United States Patent Office 2,710,423
Patented June 14, 1955

2,710,423

APPARATUS FOR THE PREPARATION OF FERTILIZER MATERIAL

Edwin J. Douglas, Whittier, Calif., assignor to Stauffer Chemical Company, a corporation of Delaware Application August 25, 1953, Serial No. 376,351

17 Claims. (Cl. 18—1)

This invention relates to an apparatus for the formation of finely divided solid materials into spheres of a desired size. The term "granulation" is frequently applied to processes of this nature which are practiced upon such materials as fertilizers, catalysts and the like. Usual methods of granulation include wetting of the solids to be granulated with a liquid and rolling of the mass upon itself while drying the mass, as by subjecting it to a flame projected into the rotary tube. This process is subject to objection in that the product is composed of hard encrusted particles of irregular size and shape. If a uniform product is required, the fines and oversize must be separated and returned for further processing; this recycle burden contributes considerable undesirable cost to a process of granulation.

In accordance with the present invention, I provide an apparatus which enables finely divided materials to be formed into spheres of uniform size, the uniformity being such that, depending on the exact conditions of operation, as much as 95% of the spheres will be substantially the same diameter, thus reducing the recycle burden. Further, the particles are generally of uniform hardness and density and do not have a hard encrusted shell and are spheroidal in shape. This is particularly of advantage in the production of catalysts wherein particle porosity and uniformity are desirable.

The apparatus of the present invention is not limited to the production of granulated materials alone. For example, it can be used to produce treble superphosphate directly from phosphate rock. In accordance with this invention, I am enabled to react the phosphate rock with phosphoric acid to produce treble superphosphate. Contact of the acid and the rock is handled as part of the granulation process so that the entire operation is completed within a matter of a few minutes.

Briefly stated, the invention contemplates an apparatus for mixing the fine solid to be granulated with sufficient liquid to form a sticky plastic mass. With a fertilizer or fertilizer material, the liquid may be water, an acid such as sulfuric, nitric or phosphoric acid, or a mixture of these, liquid ammonia, an ammonia solution, an ammonium salt or nitrate salt solution, or other compatible liquid. The liquid and solid components are mixed to form a plastic mass while a portion of the mass is withdrawn, formed into spheroids which are returned and mixed into the mass. The mixing of the liquid-solid mass and the formation of the spheroids is continued until the entire mass is composed of spheroids of a desired and substantially uniform size.

The apparatus of this invention may be in various forms and hereinafter I have disclosed two different forms which I have utilized successfully, one being directed to use along a batch line, while the other is useful for continuous practice of the invention.

It is in general the broad object of the present invention to provide a novel apparatus for converting a finely divided solid material into granules of a desired size.

A further object of the present invention is to provide a novel form of apparatus which can be employed for the granulation of materials such as fertilizers.

The invention includes other objects and features of advantage, some of which, together with the foregoing, will appear hereinafter wherein the present preferred manner of practicing the invention is set forth, together with the disclosed apparatus.

Figure 2 is a front elevation view of the device shown in Figure 1.

Figure 4 is a rear elevation view of the device shown in Figure 1.

Figure 5 is a side elevation, partly in section, taken through the device shown in Figure 1, along the line 5—5.

Figure 6 is a plan view of the bearing mounting used in the device of Figure 1.

Figure 7 is a view taken along the line 7—7 in Figure 6.

Figure 10 is a section taken through a portion of the bearing mounting.

Figure 1:
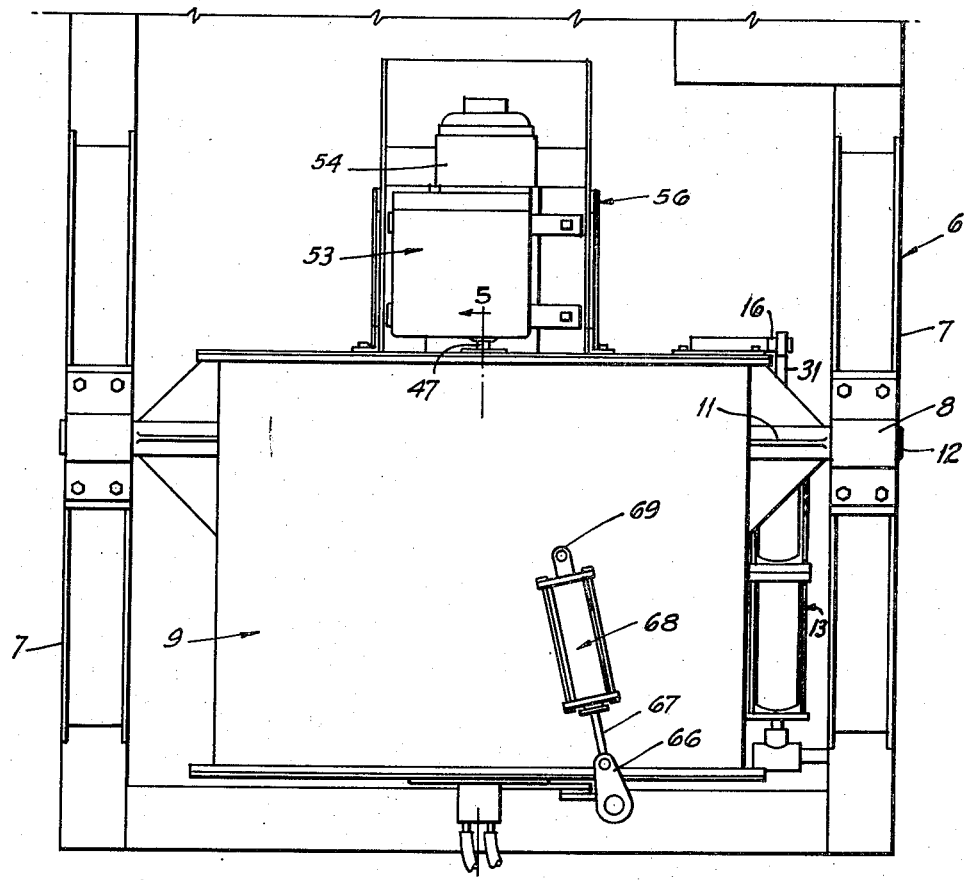
Figure 1 is a plan view of one form of the device embodying the present invention.

The device shown in Figure 1 is mounted upon a base framework 6 having vertically extending standards 7 on each side thereof, upon which are mounted bearings 8. A cylindrical housing, generally indicated at 9, has horizontal supports 11 provided diametrically and from which stub shafts 12 extend into the bearings 8.

Figure 9:
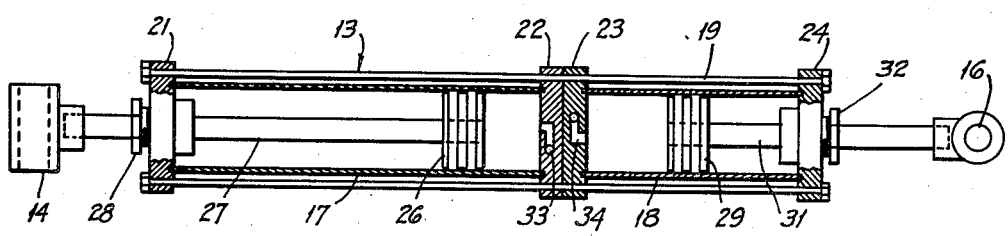
Figure 9 is a section taken through the cylinder and piston structure utilized for tilting of the device shown in Figure 1.
Figure 11:
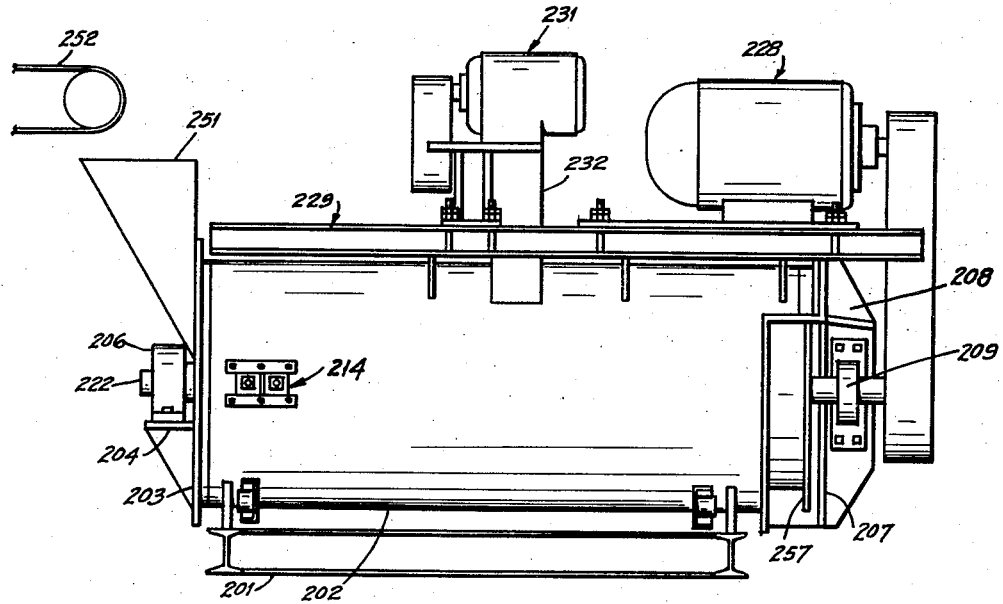
Figure 11 is a side elevation of an apparatus for continuous use in the manufacture of fertilizer and other materials.

To tilt the device when desired and for reasons which will be further explained hereinafter, a cylinder-piston structure, generally indicated at 13 (Figures 2, 3 and 9) is mounted between frame 6 as at 14 and a stub shaft 16 at the rear of the housing 9. To enable the structure to be tilted selectively, the piston and cylinder structure 13 is, in effect, provided by two separate cylinders 17 and 18 joined together by tie rods 19 extending through the several cylinder end closures 21, 22, 23 and 24, as appears in Figure 9. A piston structure 26, mounted upon a piston rod 27, is mounted within cylinder 17 and extends through a suitable stuffing gland 28 to mounting 14 upon frame 6.

A piston structure 29 is mounted upon a piston rod 31 in cylinder 18 and extends through a stuffing gland 32, to stub shaft 16 which is, in turn, secured to the rear of the housing 9. Suitable passages 33 and 34 are provided respectively in cylinder ends 22 and 23 and fluid is selectively supplied through these passages by means not shown, under the control of an operator, to provide fluid injection or release from between the respective pistons and cylinders in which they are mounted to tilt the device selectively.

Figure 3:
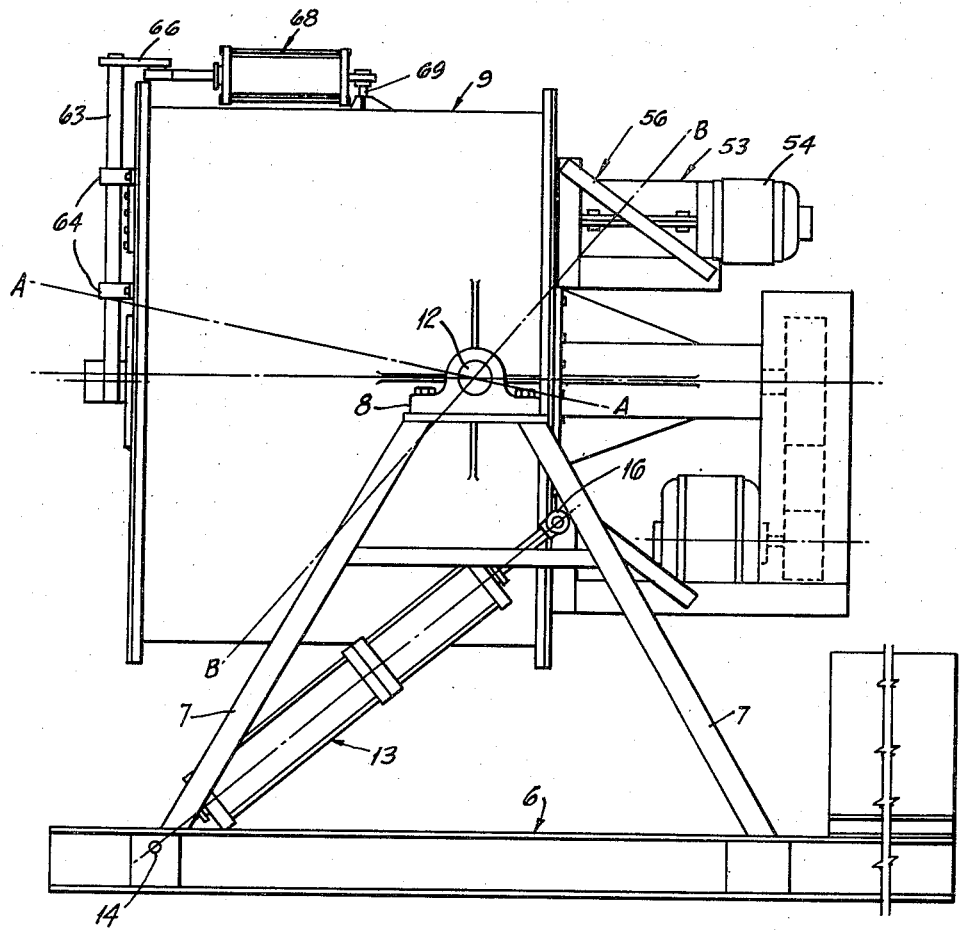
Figure 3 is a right-hand elevation view of the device shown in Figure 1.

Several extreme positions of adjustment are possible, as follows:

When the pistons 26 and 29 are each closely adjacent closures 22 and 23, the housing is tilted upwardly along line A—A in Figure 3, so its front end is raised.

When the piston 26 is closely adjacent closure 22 and piston 29 is closely adjacent closure 24, the housing is horizontal, as in Figure 3.

When the pistons 26 and 29 are respectively located in close proximity to closures 21 and 24, the housing is tilted downward along axis B—B and its front end is lowered for discharge.

Mounted for rotation within the stationary housing 9 is a rotatable cylindrical structure generally indicated at 36 (Figure 5), including a central cylindrical portion 37 and a frusto-conical end 38. A ring 39 is mounted upon the frusto-conical portion 38, the ring being supported upon three spaced bearings 41 mounted upon end wall 42 on housing 9; this supports the drum 36 for rotation on one side of housing 9. To support the drum for rotation when it is tilted with the frusto-conical end lowermost, bearings 108 (Figure 7) are each mounted on an arm 109 which is, in turn, carried on a plate 111; two plates are provided and are secured by screws 112 to the end wall 42, the arm 109 extending through an aperture 113 in the end wall 42. Screws 114 enable the plate to be held in a desired spaced relation to the wall to support the bearings 108 in a desired engagement with the forward face of ring 39. Drum 36 is closed by end wall 43, the latter having a driven ring gear 44 mounted thereon. Three spaced bearings 46 are mounted upon end wall 47 of the housing 9 and fit within the ring gear to support the other end of the drum 36 for rotation.

A drive gear 51 is provided in mesh with the ring gear 44, gear 51 being mounted upon a shaft 52 which extends through the end wall 47 into a speed reducer, generally indicated at 53 (Figure 1), the latter being driven by a motor 54 mounted upon a suitable support structure generally indicated at 56 (Figure 3) on end wall 47.

Figure 8:
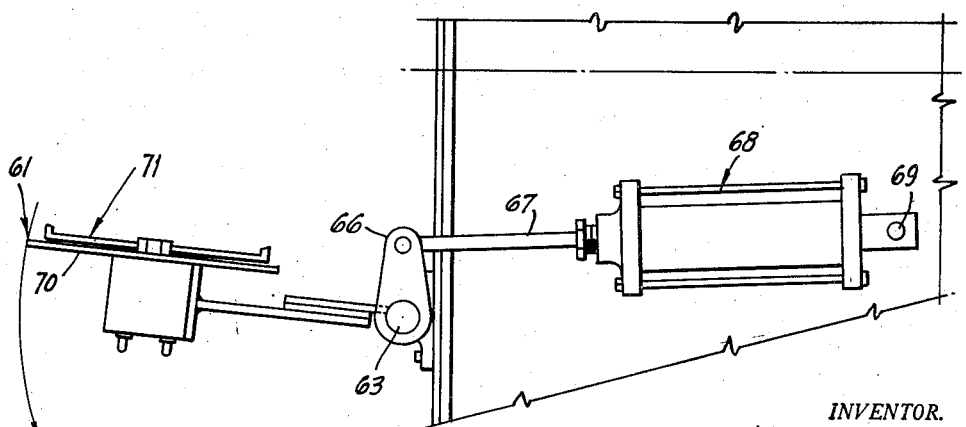
Figure 8 is a view showing opening of the door structure on the front of the device shown in Figure 1.

The openings provided in the end wall 42 of structure 9 and in the drum 36 are closed by a door structure generally indicated at 61, the latter being mounted upon an arm 62 fixed on an end of shaft 63 journaled in bearings 64 mounted upon end wall 42 of the housing 9 (Figures 1, 2, 3 and 8). The other end of shaft 63 includes an arm 66 engaged with a piston rod 67 extending into a piston-cylinder structure generally indicated at 68, the latter being hinged as at 69 upon the top of the drum 9. When fluid is supplied suitably to the piston-cylinder structure 68, the door 61 can be opened and closed selectively, as desired. The door structure includes a separate, rotatable plate 71 and a fixed plate 70 engaging the aperture in the housing 9, while the rotatable plate 71 engages the opening in drum 36 (Figure 8).

To seal the door structure 61 against material loss, the frusto-conical end 38 on the cylindrical structure 36 is provided with a ring 303 having a hard metal face thereon and which rotates in engagement with a ring 305 having a like face and provided on annulus 304. The annulus 304 is supported on four studs 306 and is urged (Figures 2 and 5) by springs 307 to maintain the hard face on the attached ring 305 in engagement with the like face on ring 303.

A cutter bar 301 is mounted on the inner face of door 61 to rotate within rings 303 and 305 and annulus 304 and so keep the door free of material. An hydraulically operated motor 302 is mounted on the door 61 on arm 62; the motor swings the cutter bar 301 through an arc of at least 180°.

Mounted centrally within the drum 36 for rotation therein is a rotor blade structure, generally indicated at 81 (Figures 5 and 10), and which includes a central shaft 82 extending through a bearing structure, generally indicated at 83, and which is presently described in detail. Shaft 82 extends from the bearing structure 83 of the rear of housing 9 and carries several pulleys 84 thereon. Belts 86 are trained about pulleys 84, and about pulleys 87 on electric motor shaft 88, the electric motor 89 being mounted upon supporting bracket structure 91 on the rear of the housing 9, as is shown in Figure 4. The motor shaft 88 and central shaft 82 can be provided with suitable pulley sheaves enabling the speed of rotation of shaft 82 to be controlled as desired.

Bearing 83 is made up of a tubular member 101, which extends through end wall 47 of the drum 9 and is secured thereto by triangular support elements 102, which are welded between the end wall 47 and the cylindrical member 101. Suitable seals and thrust-bearings (not shown) are mounted in the cylindrical member to support the shaft 82; lubricant is supplied as through fitting 103. One end of cylindrical member 101 is welded to a ring 106 which, in turn, fits the end wall 43 snugly, a rubber sealing ring 107 being provided between the two. Ring 106 is closed by a plate 114 secured in place by cap screws 116. Welded upon the plate is a cutter bar, generally indicated at 117 and which, as is shown in Figure 5, fits closely adjacent to and extends upwardly along the end wall 43, across cylindrical member 37 and downwardly along frusto-conical portion 38 and outwardly through the opening in drum 9, being secured in place by studs 118 upon a bracket 119, the latter being in turn secured by studs 121 to the end wall 42.

Mounted upon the end of shaft 82 is a closure plate 122, the latter having a tongue and groove seal, as indicated at 123, with plate 114 (Figure 10).

The forward end of shaft 82 is threaded as at 126, and a nut 127 is provided thereon to retain in place a spool structure generally indicated at 128, which includes a plurality of spaced annular members 129 extending about the spool, the spool fitting snugly against a shoulder 131 provided upon shaft 82. The several rotor blades 133 are each mounted between the spaced annular members 129 on rods 132, which extend through the several annular members 129 to provide a support for the rotor blades, the blades being thus mounted for limited oscillation upon the rods and with respect to shaft 82. Referring particularly to Figures 5 and 10, it will be noted that the rotor blades 133 are arranged in rows extending parallel to the longitudinal axis of the shaft 82, the blades in each row being arranged in a closely spaced relationship with their faces parallel, thus providing a relatively narrow slot between adjacent blade pairs through which material may pass when thrown into the rotor blade structure 81 from the cutter bar 301. The material in contact with a flat face of a blade rolls across such flat face and so is formed into a ball.

The rotor-blades can readily be removed and replaced with others by removing nut 127 from the threaded end of shaft 82, release of the nut permitting removal of closure annular plate 136 and of the several rods 132 whereby the rotor blades can be removed readily and replaced with others, as desired.

A charge of a suitable material to be granulated is placed in the drum with the latter horizontal or tilted slightly to admit the charge, together with a sufficient source of moisture such as water, acid or other liquid. The drum is then tilted to approximately line A—A.

When the drum is rotated, it will be found that the mixture quickly becomes gummy and mastic and would stick to the wall of the housing 36 except for the presence of the cutter bar 117 (Figure 5), which cuts the material off the drum as it rotates and drops down into the rapidly rotating rotor-blades. By observing the power consumption of the motor, one will find that during the gummy, mastic stage, the material requires considerable power to break it up into relatively small masses, but as the material dries somewhat and forms into round balls, the power requirement decreases considerably. When the stage of optimum particle size is reached, the drum is tilted counter-clockwise to discharge its contents.

In Figures 11 through 15 in the drawings, a continuous unit is shown, one wherein the material is fed in continuously at one end of a rotating drum and is withdrawn from the other end of the drum in finished pelleted form. This device includes a suitable framework, generally indicated at 201, providing a base for a stationary cylindrical housing 202. At its inlet or feed end, the drum 202 includes a suitable partial end closure 203, having a bracket 204 thereon upon which is mounted a bearing 206. At its outlet end, the drum includes an end closure 207 having a bracket 208 secured thereon and providing a mounting for a bearing 209.

A cylindrical drum 211 is supported and mounted for rotation within the stationary housing 202, this support being provided by two sets of three spaced trunnions 212 (Figure 15), each trunnion set being provided at spaced points about the drum 212 and engaging one of the pair of flanges 213 secured to the drum 211 at opposite ends thereof. A thrust bearing, generally indicated at 214, is mounted upon the side of the cylinder 202 and includes a rotatable wheel 216 riding against that face of each of the flanges 213 which is toward the outlet end of the drum to take up the thrust provided by the drum 211 during rotation.

Mounted for rotation within the drum 211 is a rotor structure, generally indicated at 221, mounted upon a shaft 222, the latter being mounted for rotation in bearings 206 and 209. Shaft 222 includes a V-belt pulley 223 at one end thereof, a plurality of V-belts 224 being extended about the pulley 223 and a pulley 226 on motor shaft 227. The motor shaft extends from motor 228 which is mounted upon a framework, generally indicated at 229, upon the top portion of the housing 202.

Figure 12:
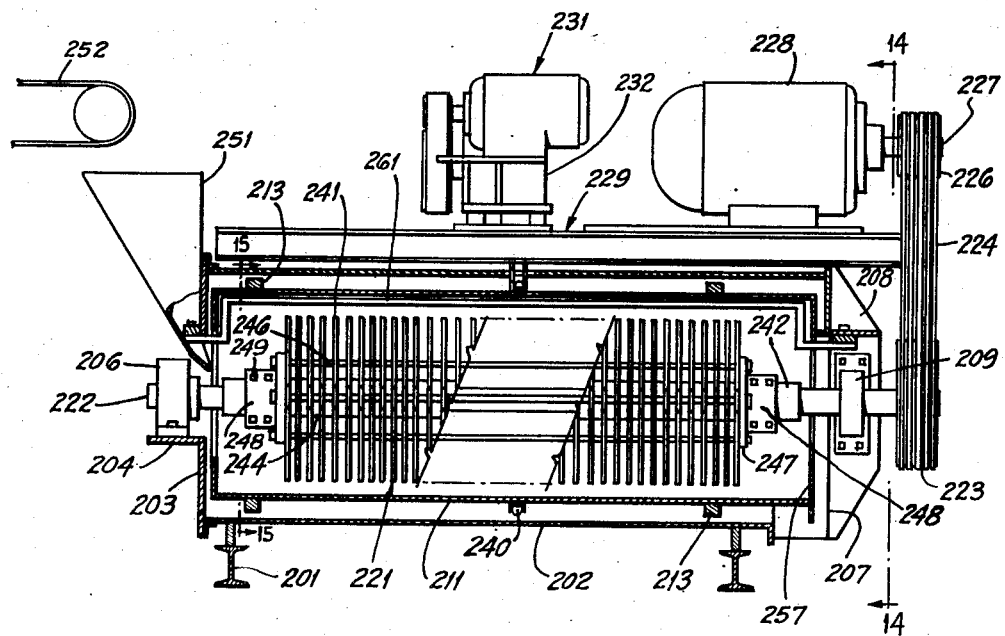
Figure 12 is a side elevation view with portions of the apparatus being shown in section.
Figure 13:
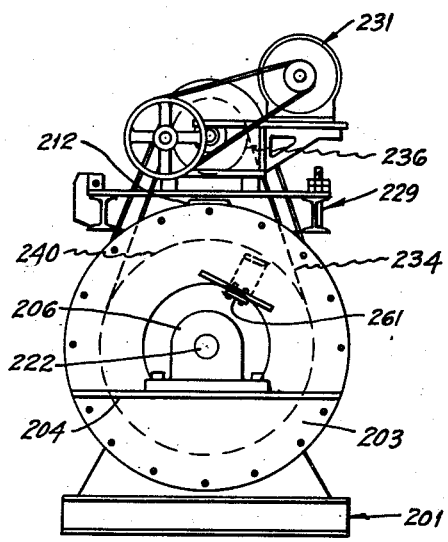
Figure 13 is an end elevation view taken from the charging end of the drum with the feed hopper omitted to facilitate illustration.
Figure 14:
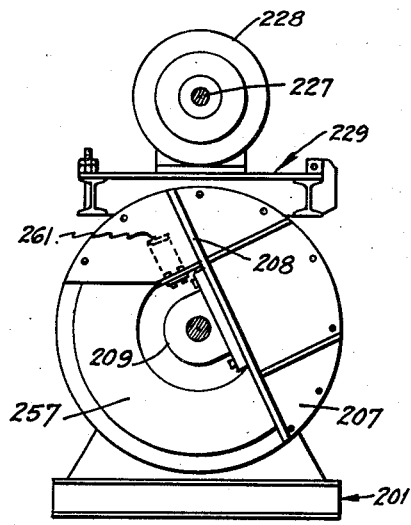
Figure 14 is a section taken along the line 14—14 in Figure 12.

Drum 211 is driven by a motor speed reducer unit generally indicated at 231 and which is in turn mounted upon a bracket 232, carried upon the frame 229 upon the top of drum 202. A V-belt 234 is extended about a pulley 236 on the motor speed reducing unit 231, and about a pulley face 240 on the drum 211, as is shown in Figures 12 and 13.

Supported on bracket 208 and on the upper side of the end closure 203 of the drum 202 is a cutter blade 261, fitting closely each of the end closures of the drum 211 and the internal surface of the drum so that material carried by the drum is cut off and dropped down into the rotor as the drum 211 is rotated.

Figure 15:
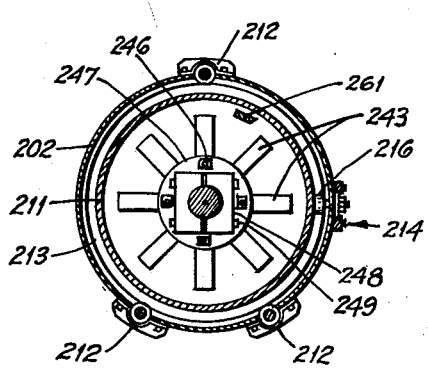
Figure 15 is a section taken through the device and showing the trunnion rollers for supporting the drum for rotation and the end thrust rollers.
Figure 16:
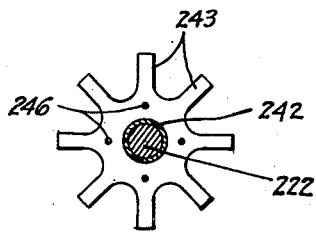
Figure 16 is a plan view of a rotor blade.

The rotor 221 is made up of a plurality of cutting bladed elements 241; each element includes a central annular hub 242 fitting shaft 222 and having, in the form shown, eight radial blades 243. Spacers 244 are mounted between adjacent elements and the assembly is retained together as a unit by a plurality of rods 246 extended between collars 247 at each end of shaft 222. The assembled elements are retained in place on the shaft by the square retainer blocks 248 which clamp about the shaft and against the collars 247 by bolts 249. It will be noted that each of rods 246 is positioned opposite one of the square faces on the retainer blocks 248 so that any one of the rods can be withdrawn selectively upon loosening of the nuts on its ends without disturbing one of the other rods. This construction enables the blades to be readily repaired or replaced. Referring particularly to Figures 12, 15 and 16, it will be noted that the rotor blades 243 are arranged in rows extending parallel to the longitudinal axis of the shaft 222, the blades in each row being arranged in a closely spaced relationship with their faces parallel, thus providing a relatively narrow slot between adjacent blade pairs through which material may pass when thrown into the rotor blade structure 221 from the cutter bar 261. The material in contact with a flat face of a blade, rolls across such flat face and so is formed into a ball.

Various modifications are possible in the rotor and its operation. For example, the rotor blades can be fixed on the supporting shaft or can be free to swing through a limited range. The fixed type of blade is preferred because it is less expensive to construct and is free of the wear which occurs on the supports for the swinging blades. In addition, the rigid hammers require less power; for example, in a batch machine operating on a 650-pound batch of acid and phosphate rock to manufacture treble superphosphate, 20–22 kw.-h. were required to rotate the swinging hammers at 950 R. P. M. as against 15–16 kw.-h. to rotate the fixed blade hammers at the same speed, that is, 950 R. P. M.

The rotor can rotate with the drum or in the opposite direction. The former type of operation is preferred because the total power input required is less when the drum and rotor rotate in the same direction.

In a batch device, one can stop the rotor after the machine has been in operation for some minutes and just before dumping. This has the effect of reducing undersize material for the pellets roll up on themselves into pellets of a larger size. If they become too large, a few seconds' rotation of the rotor will break them down to small size. The same effect can be attained in a continuous machine by having a short space at the discharge end of the rotating drum which is free of the rotor blades.

An inlet hopper, generally indicated at 251, is provided at the inlet end 203 of the drum 202, and material to be processed in the drum can be delivered thereto as by conveyor belt 252. Material issuing from the drum 202 spills out over the annulus 257 providing an end on drum 211 and thence onto another conveyor belt or onto a pile, as desired.

In operation, the subframe 201 is supported by suitable means, generally at a slight angle to the horizontal so that the inlet end of the drum 211 is elevated at an acute angle with respect to the outlet end. The angle of the drum is varied with the material processed and with the retention time of material desired for processing of a given material. For example, with the drum 211 six feet in length and three feet in diameter, rotating at a speed of 22 R. P. M. and with the rotor 221 having an overall diameter of 29" and rotating at a speed of 800 R. P. M., phosphate rock and acid was retained for between 45 to 60 seconds, the drum being at an angle of 3° to the horizontal. The drum angle can vary usually between about 3° and 10°, depending on the load and the retention time desired.

Figure 17:
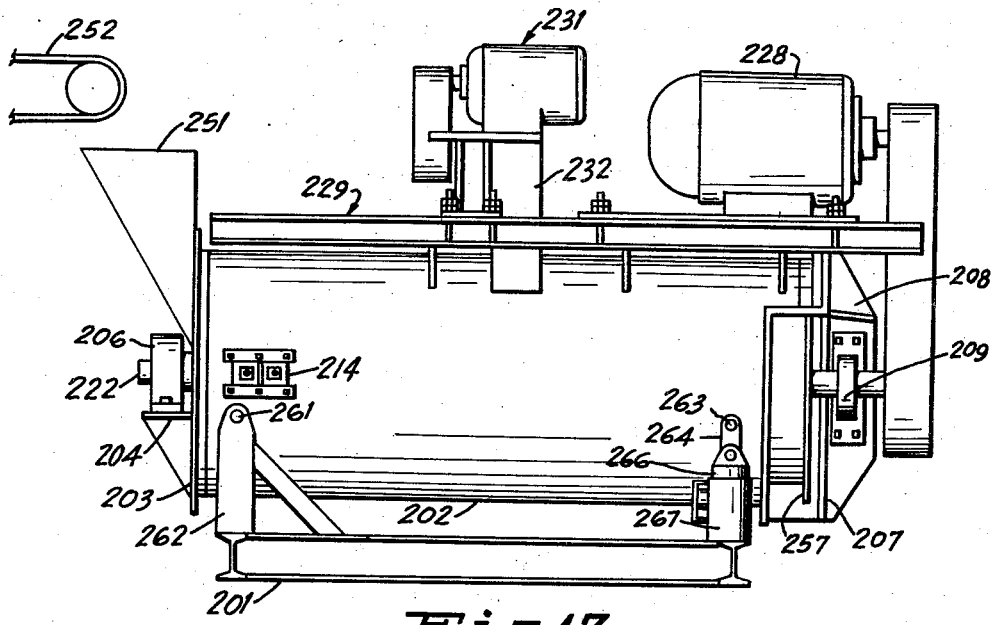
Figure 17 is a modified form of apparatus including means for controlling the quantity of material subject to granulation.
Figure 18:
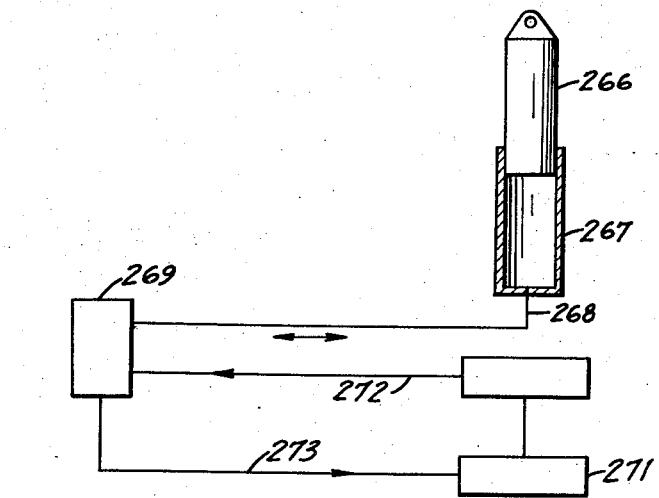
Figure 18 is a schematic view of the control means and system utilized in the apparatus shown in Figure 17.

The angle of inclination of drum 211 can be altered to maintain a mass of constant weight in the drum. This is of advantage in ensuring constant quality control on the product. In Figures 17 and 18, I have shown the inlet end of drum 211 supported by stub shafts 261 in brackets 262 mounted on frame 201. The outlet end of the drum is supported by stub shafts 263 engaged with links 264 which are joined to one of end pistons 266. Cylinders 267 are mounted on the frame 201 and support each piston in position to raise and lower the outlet end of the drum. The lower end of each cylinder is connected to a common pipe 268 which is in turn connected to a constant pressure control regulator 269. Fluid under pressure is supplied from reservoir 271 by pump 272 through line 270, while fluid is returned through line 273 from the regulator 269 to the reservoir. The regulator 269 is so adjusted that if the total load in the drum increases, fluid is released from the cylinders 267 and the drum angle is lowered to release material until the desired load is attained. If the load in the drum decreases, fluid is supplied to the cylinders until the drum load again applies the desired pressure on the regulator.

The apparatus described can be utilized to manufacture various fertilizer materials as follows:

*Example I.*—Utilizing a drum having a diameter of two feet and rotated at a speed of 176 feet per minute with a rotor 16" in diameter rotating at 1750 R. P. M., materials having the following screen analysis were obtained upon a single superphosphate made from Montpelier, Idaho, phosphate rock and taken directly from the den with no added moisture; each charge weighed 65 pounds.

| Retention time in mixer in seconds | Percentage Screen Size | | | | Percent moisture |
|---|---|---|---|---|---|
| | +4 | −4+6 | −6+20 | −20 | |
| 15 | 7 | 12 | 78 | 3 | 8.1 |
| 40 | 4 | 4 | 73 | 19 | 7.8 |
| 60 | 2 | 4 | 65 | 29 | 7.5 |

*Example II.*—Utilizing the mixer of Example I with 22.76 pounds of Sage A bed rock averaging 31% $P_2O_5$ and 33.35 pounds of crude Anaconda phosphoric acid of 70% strength heated to 125+−130+° F., the mixing being continued for seven minutes, a product was secured having the following analysis:

*Screen analysis*

| | Percent |
|---|---|
| +4 mesh | 5 |
| −4+20 mesh | 80 |
| −20 mesh | 15 |

The −20 mesh material was not dusty and was in the form of individual particles.

The material was dried immediately; chemically, the material analyzed as follows:

| Total $P_2O_5$ | Insoluble $P_2O_5$ | Available $P_2O_5$ | F. A. | Moisture |
|---|---|---|---|---|
| Percent 46.6 | Percent 3 | Percent 43.6 | Percent 4.8 | Percent 5.7 |

The conversion was 79%; the available $P_2O_5$ content was 45.2% on the basis of a moisture content of 2.5%.

*Example III.*—Utilizing a batch machine with a drum 49" in diameter, rotating at 18 R. P. M., with a rotor of 30" diameter having 36 blades and rotating at 750 R. P. M., the following results were obtained on a 650 pound batch of Sage A-bed rock having a 13% moisture content and using 73–73.5% phosphoric acid at 125–135° F. and a $P_2O_5$ acid to rock ratio of 2.3 to 2.4. The total time in the drum was eight to nine minutes, allowing 90 seconds for charging and 30 seconds for dumping.

*Screen analysis*

| | Percent |
|---|---|
| +6 mesh | 7 |
| −6+20 mesh | 72 |
| −20 mesh | 21 |

The material discharged had a 10–11% moisture content; it was dried to 3–4%. After two weeks' standing, the material had the following analysis:

| Total $P_2O_5$ | Insoluble $P_2O_5$ | Available $P_2O_5$ | F. A. | Moisture |
|---|---|---|---|---|
| Percent 48.2 | Percent 2.1 | Percent 46.1 | Percent 1.9 | Percent 4.2 |

*Example IV.*—The apparatus of Example III was used to pelletize previously mixed acid and rock mixtures which had been aged thirty days in the case of the Sage A-bed rock, and seven to eight days in the case of the Sage Beneficiated Rock. Data and conclusions are tabulated as follows:

| | Sage Beneficiated | Sage Beneficiated | Sage 5% $R_2O_3$ | Sage 5% $R_2O_3$ |
|---|---|---|---|---|
| Pelletizer load, lbs | 650 | 650 | 600 | 600 |
| $P_2O_5$ acid/rock | 2.4 | 2.3 | 2.4 | 2.3 |
| Acid strength, percent | 73–73.5 | 73–73.5 | 73–73.5 | 73–73.5 |
| Acid temperature, ° F | 125–135 | 125–135 | 125–135 | 125–135 |
| Total time, minutes | 9 | 7 | 18 | 12 |
| Screen analysis: | | | | |
| +6 mesh | 8 | 6 | 16 | 12 |
| −6+20 mesh | 77 | 84 | 83 | 86 |
| −20 mesh | 15 | 10 | 1 | 2 |

Analytical data on the pile material was as follows:

| | Pile No. 1—Sage A-Bed | Pile No. 2—Sage-Bene. | Pile No. 3—Sage-Bene. |
|---|---|---|---|
| Rock $P_2O_5$, percent | 31 | 32 | 32 |
| Rock $R_2O_3$, Percent | 2–2.5 | 3.0 | 3.0 |
| $P_2O_5$ acid/rock | 2.4 | 2.4 | 2.3 |
| Age of pile, days | 30 | 7 | 8 |
| Pile Analysis: | | | |
| Total $P_2O_5$, percent | 47.2 | 48.0 | 47.6 |
| Insoluble $P_2O_5$, percent | 1.8 | 1.7 | 2.0 |
| Available $P_2O_5$, percent | 45.4 | 46.3 | 45.6 |
| Free acid $P_2O_5$, percent | 2.0 | 3.5 | 3.2 |
| Moisture, percent | 6.2 | 5.0 | 5.2 |
| Resid. conc. $H_3PO_4$, percent | 39 | 66.5 | 62.4 |
| Percent conversion | 86.9 | 87.8 | 86.0 |

*Example V.*—1,000 pounds of phosphate rock containing 31.5% $P_2O_5$ was weighed into a batch hopper, while 1,450 pounds of phosphoric acid (72.5% $H_3PO_4$) were weighed out; the acid was preheated to a temperature of 135°–140° C. The material was then discharged into a drum of the type of Examples I–IV, but of larger capacity, along with 280 pounds of oversize recycle material which had been reground in a hammer mill and 350 pounds of undersize recycle material. The drum 36 was then rotated for nine minutes, following which the material was discharged. It amounted to 3,070 pounds of product having a moisture content of 9.5%, a free acid content as $P_2O_5$ of 7.5%, an available $P_2O_5$ content of 43.5%, and a total $P_2O_5$ content of 45.5%. The material was then dried in a rotary gas-fired drier wherein the material was passed in parallel flow to a hot combustion gas, the material issuing from the drier at a temperature of 180°–200° F., while the gas temperature was approximately 300° F. The material was then cooled in a rotary air cooler to 120°–125° F., following which it was held on a storage pile for from two to three weeks. The material from the storage pile then had a $P_2O_5$ content of 47–48%, an available $P_2O_5$ content of 45.5–46.5%, from 3% to 4% moisture and from 2% to 3% of free acid as $P_2O_5$. This material was screened and that material which passed a 20-mesh screen and that material which was retained on an 8-mesh screen were returned for admixture to a later batch, there being 350 pounds of the undersize material and 280 pounds of the oversize material. The final product amounted to 2,315 pounds and was of a size such that it would all pass an 8-mesh screen and be retained on a 20-mesh screen. It contained 48% $P_2O_5$, 46% of available $P_2O_5$, 3–4% moisture, and had a free acid as $P_2O_5$ of 2–3%.

*Example VI.*—The equipment of Figures 1–10 and Example V can also be used to pelletize previously aged single superphosphate. As typical of this operation, 1,000 pounds of aged single superphosphate was taken from a pile, the material having an available $P_2O_5$ content of 18%. The material was crushed to 1" to 2" lumps and was then introduced into the drum 36 along with approximately 40 pounds of water, 100 pounds of undersize material, and 200 pounds of oversize material which had been reground in a hammer mill. The material was mixed in the batch pelletizer for three minutes and was then discharged into a rotary gas fired drier, wherein it passed in parallel flow with a hot combustion gas, approximately 40 pounds of water being driven off, and the material having a final exit temperature of 180°–200° F. It was then cooled in a rotary air cooler to 120–125° F., and passed over a screen wherein material coarser than 8-mesh and finer than 20-mesh was removed, there being 200 pounds of larger than 8-mesh material and 100 pounds of the smaller than 20-mesh material. The product amounted to 1,000 pounds having an 18% available $P_2O_5$ content, the product being uniform spheroids of substantially uniform texture in cross-section. The oversize material was crushed in a hammer mill and was then returned to the drum 36 while the undersize material was fed directly to the drum 36 with another batch.

*Example VII.*—The continuous drum device of Figures 11–16 can also be utilized to produce a fertilizer material as desired. For example, to produce pelletized single superphosphate, 1,000 pounds per hour of milled superphosphate having an 18% available $P_2O_5$ content was fed into a continuous pelletizer along with 80 pounds of water per hour, 120 pounds over oversize material finer than 20-mesh. The drum was that previously described in connection with Figures 11–16. The material was passed through the continuously rotating drum 211 which had a retention time of approximately one minute. The material issuing from the drum was passed into a rotary drier wherein it passed in parallel flow with a hot drying gas at such a rate that approximately 60 pounds of water were removed from the material and the material issued from the drier at a temperature of 180°–200° F. The product was then cooled in a rotary air drier to 120°–125° F. and screened to remove material coarser than 8-mesh and finer than 20-mesh, the production amounting to 1,000 pounds of material per hour having 18% available $P_2O_5$ content, and a moisture content of 6%; by drying the material to a 3% free moisture content, the available $P_2O_5$ content was increased to 19%.

To provide an ammoniated superphosphate, 1,000 pounds per hour of previously ground and aged superphosphate was dropped down a vertical pipe of relatively narrow section while 15 pounds per hour of anhydrous ammonia were introduced into the bottom of the pipe, this serving to neutralize free acid present in the superphosphate and convert dicalcium phosphate partially to monocalcium phosphate. The resulting material was then fed into the continuous drum along with 180 pounds per hour of previously ground oversize material and 450 pounds per hour of undersize material. In addition, 50 pounds per hour of water and 130 pounds per hour of an ammonia solution containing 20% nitrogen were properly sprayed in at the inlet end of the continuous drum. The drum had a retention time of approximately one minute. The material issuing from the pelletizer was then passed into a rotary drier wherein it was passed in parallel flow to a hot drying gas, 200 pounds per hour of water being driven off, and the material issuing from the drier at approximately 180–200° F. It was cooled in a rotary air cooler to 120–125° F. and then passed over a screen to eliminate material coarser than 8-mesh and finer than 20-mesh. The resulting product, amounting to 925 pounds per hour, had a 17% available $P_2O_5$ content, and a 4% nitrogen content. If desired, the undersize material can remain in the product since it is merely fine pellets.

*Example VIII.*—In the manufacture of triple superphosphate, 1,000 pounds per hour of phosphate rock having 31–32% available $P_2O_5$ content was introduced into a mixer discharging into a continuous rotary den along with 1,450 pounds per hour of crude phosphoric acid containing 72–73% $H_3PO_4$, the acid being at a temperature of 135–140° F. Also fed to the den by addition to the acid-rock mixer were 460 pounds of undersize material and 350 pounds of oversize material, the latter having been ground in a hammer mill prior to addition to the mixer. The material remained in the den for approximately ten to twelve minutes, following which it was cut out and removed, being fed into the described continuous drum 211 along with 30 pounds of water per hour. The material remained in the drum for approximately one minute, the total feed rate to the drum being 3,290 pounds of material per hour. The product issued from the pelletizer at 150–160° F.; it amounted to 3,270 pounds of material per hour having a total $P_2O_5$ content of 45–46%, a free acid content of 7–8%, and contained from 9–10% moisture.

The material was then passed into a parallel-flow gas fired drier wherein 200 pounds of water were driven off, the material issuing from the drier at 180–200° F. and being cooled in a rotary air cooler to 120–125° F. It was then permitted to remain on the storage pile from two to three weeks, following which it was screened to remove over and undersize material. The resulting product, of a size between —8 and +20 mesh, amounted to 2,315 pounds and had a total $P_2O_5$ content of 48%, an available $P_2O_5$ content of 46%, a moisture content of 3–4%, and a free acid content of 2–3% as $P_2O_5$. If deemed desirable, this product can be dried further to reduce the moisture content and so up-grade the material.

The previously described drum 211 was employed to pelletize treble superphosphate taken from a continuous den. The drum was 36″ in diameter and six feet long, roating at 22 R. P. M.; the rotor was 29″ in diameter and was rotated at 800 R. P. M. The material was fed to the drum at the rate of 11–12 tons per hour. The phosphoric acid contained 72% $P_2O_5$ and was heated to a temperature of 135–140° F. The ratio of acid feed to rock was 2.3 to 2.4 on a $P_2O_5$ basis. The material was retained in the den for from twelve to fourteen minutes; the drum had a slope of approximately 3° and retained the material for approximately 60 seconds; the three blades at the front and at the rear of the rotor were absent. Water was supplied to the drum between 0.8 and 1.3 gallons per minute. The material had an average particle size such that 12% was retained on a 6-mesh screen, 82% passed a 6-mesh screen and was retained on a 20-mesh screen, and 6% passed the 20-mesh screen.

In another operation, but utilizing all rotor blades and a slightly higher pelletizer water feed of 1.5 to 2.0 gallons per minute, the material produced was of a size such that 13% was retained on an 8-mesh screen, 62% passed the 8-mesh screen but was retained on a 20-mesh screen, while 25% passed the 20-mesh screen.

While in the foregoing I have dealt with fertilizer materials, it will be obvious to those skilled in the art that other materials can be utilized and can be successfully formed into spheres of a desired size by coordinating the ratio of solid material, liquid, drum speed and rotor speed. One can readily determine the correct operating conditions for any given material and for any given rate of feed if one observes certain basic operating principles in connection with the machine and process involved. Thus, the rotating drum acts as a continuous feeder for the high speed rotor, while the rotor throws material off tangentially against the drum with such force that if any portion of the mass discharged against the drum is not well mixed or is too wet, it will become plastered against the side wall of the drum, which then carries it around to the cutter bar. The cutter bar cuts the maerial from the drum and drops it back into the rotor. This operation is continued until the mass is of a uniform plasticity. The three elements, the drum, the rotor, and the cutter bar cooperate to achieve thorough and uniform plasticity in the material. As the material attains a uniform plasticity, the rotor blades striking the plastic material form the material into spheroids, the wet plastic material rolls across the blades of the rotor and is so formed into spheroids. As the operation is continued, the rolling, cutting, and sphere-forming action continues until the mass is of a desired plasticity and size of spheroid.

I claim:

1. In a device of the character described, a drum, means supporting the drum for rotation about the axis of rotation of the drum, a cutter bar extending along in close proximity to the inner surface of the drum adjacent the top of the drum to cut material adhering to the drum wall and release it for a free gravital fall in said drum, and a plurality of cutter blades supported for rotation in said drum to receive said material falling in the drum after cutting from the drum by said cutter bar, said plurality of cutter blades being mounted radially and in rows with adjacent blades in each row spaced apart to provide a relatively narrow passageway for material between said adjacent blades.

2. In a device of the character described, a drum, means supporting the drum for rotation about its longitudinal axis, a cutter bar extending along in close proximity to the inner surface of the drum adjacent the top of the drum to cut material adhering to the drum wall and release it for a free gravital fall in said drum, a plurality of cutter blades supported for rotation in said drum to receive said material falling in the drum after cutting from the drum by the cutter bar, said plurality of cutter blades being mounted radially and in rows with adjacent blades in each row spaced apart to provide a relatively narrow passageway for material between said adjacent blades, means for rotating the drum at one speed, and means for rotating the cutter blades at a second speed several times said one speed.

3. In a device of the character described, a drum, means supporting the drum for rotation about its longitudinal axis, means for feeding material into the drum at one end thereof, a cutter bar extending along the inner surface of the drum adjacent the top of the drum and in close proximity to the drum to cut material adhering to the drum wall and release it for a free gravital fall in said drum, a plurality of cutter blades supported for rotation in said drum and to receive said material falling in the drum after cutting from the drum by said bar, said plurality of cutter blades being mounted radially and in rows with adjacent blades in each row spaced apart to provide a relatively narrow passageway for material between said adjacent blades, and means for removing material from the other end of the drum.

4. In a device of the character described, a drum, means supporting the drum for rotation about its longitudinal axis, means for feeding material into the drum at one end thereof, a cutter bar extending along and in close proximity to the upper surface of the drum and parallel to said axis to cut material adhering to the drum wall and release it for a free gravital fall in said drum, a plurality of cutter blades supported for rotation in said drum and to receive said material falling in the drum after cutting from the drum by said bar, said plurality of cutter blades being mounted radially and in rows with adjacent blades in each row spaced apart to provide a relatively narrow passageway for material between said adjacent blades, means for rotating the drum at one speed, means for rotating the cutter blades at a second speed which is several times said one speed, and means for removing material from the other end of the drum.

5. In a device of the character described, a drum, means supporting the drum for rotation about its longitudinal axis, means for feeding material into the drum at one end thereof, a cutter bar extending along and in close proximity to the inside of the drum adjacent the top of the drum to cut material adhering to the drum wall and release it for a free gravital fall in said drum, a plurality of cutter blades supported for rotation in said drum and to receive said material falling in the drum after cutting from the drum by said bar, said plurality of cutter blades being mounted radially and in rows with adjacent blades in each row spaced apart to provide a relatively narrow passageway for material between said adjacent blades, means for rotating the drum at one speed, means for rotating the cutter blades at a second speed which is several times said one speed, means for removing material from the other end of the drum, and means for tilting the drum to raise and lower one end of the drum with respect to the other end of the drum to control the weight of material retained therein.

6. In a device of the character described, a drum, means supporting the drum for rotation about its longitudinal axis, a cutter bar extending along in close proximity to the inner surface of the drum adjacent the top of the drum to cut material adhering to the drum wall and release it for a free gravital fall in said drum, and a plurality of cutter blades supported for rotation in said drum in a spaced relation to at least one end of the drum to receive said material falling in the drum after cutting from the drum by said cutter bar, said plurality of cutter blades being mounted radially and in rows with adjacent blades in each row spaced apart to provide a relatively narrow passageway for material between said adjacent blades.

7. In a device of the character described, a drum, means supporting the drum for rotation about its longitudinal axis, a cutter bar extending along in close proximity to the inner surface of the drum adjacent the top of the drum to cut material adhering to the drum wall and release it for a free gravital fall in said drum, a rotor extending parallel to said axis and supported for rotation in said drum to receive said material falling in the drum after cutting from the drum by the cutter bar, said plurality of cutter blades being mounted radially and in rows with adjacent blades in each row spaced apart to provide a relatively narrow passageway for material between said adjacent blades, means for rotating the drum at one speed, means for rotating the rotor at a second speed at least several times said one speed, the rotor including a plurality of radially extending cutter bars fixed on the rotor.

8. In a device of the character described, a drum, means supporting the drum for rotation about its longitudinal axis, means for feeding material into the drum at one end thereof, a cutter bar extending along in close proximity to the inner surface of the drum adjacent the top of the drum to cut material adhering to the drum wall and release it for a free gravital fall in said drum, a rotor including a plurality of cutter blades mounted radially on the rotor and in rows thereon with adjacent blades in each row spaced apart a distance sufficient only to provide a relatively narrow passageway for material between adjacent blade pairs, means supporting the rotor for rotation in said drum and to receive material falling in the drum after cutting from the drum by said bar, and means for removing material from the drum.

9. In a device of the character described, a drum having a longitudinal axis, means supporting the drum for rotation about said axis in one direction, a cutter bar extending along the inner surface of the drum adjacent the top of the drum to cut material adhering to said inner surface and release the material for a free gravital fall, a rotor supported parallel to said drum longitudinal axis, means for rotating the rotor in the drum, the rotor having a plurality of radially extending cutter blades thereon extending along the rotor in rows from substantially one end of the drum to the other end of the drum, said blades each having a flat planar face extending parallel to the plane of rotation of the blades, adjacent blade pairs in each row being spaced apart only a distance sufficient to provide a relatively narrow passageway for material between said adjacent blade pairs.

10. A device as in claim 9 wherein the cutter blades are hinged on the rotor.

11. A device as in claim 9 wherein the cutter blades are fixed on the rotor.

12. In a device of the character described, a cylindrical drum having a longitudinal axis; means supporting said drum with said axis substantially horizontal; a rotor having a longitudinal axis extending substantially parallel to the axis of the drum, said rotor having a plurality of radially extending cutter blades mounted thereon in rows, each blade having opposite flat faces thereon extending parallel to the rotational path of the rotor, the faces on adjacent blades being spaced apart a distance only sufficient to provide a narrow slot between the blades; means supporting the rotor for rotation about its longitudinal axis; cutter bar means mounted closely adjacent to the inner surface of the drum to cut material adhering to the inner surface of the drum; and means for moving the drum and cutter bar relative to one another to render the cutter bar means effective to cut material adhering to the drum inner surface free of said inner surface and to deliver said cut material by gravital fall into said rotor.

13. In a device of the character described, a cylindrical drum having a longitudinal axis; means supporting said drum with said axis substantially horizontal; a rotor having a longitudinal axis extending substantially parallel to the axis of the drum, said rotor having a plurality of radially extending cutter blades mounted thereon in rows extending parallel to the longitudinal axis of the rotor, each blade having opposite flat faces thereon extending parallel to the rotational path of the rotor and being closely adjacent to one another; means supporting the rotor for rotation about its longitudinal axis; cutter bar means mounted closely adjacent to the inner surface of the drum to cut material adhering to the inner surface of the drum; means for moving the drum and cutter bar relative to one another to render the cutter bar means effective to cut material adhering to the drum inner surface free of said inner surface and to deliver said cut material by gravital fall into said rotor; and means for rotating the rotor at a speed which is at least several times that of cutter bar relative to the drum.

14. An apparatus for forming a damp mixture into small finely divided free-flowing pellets; the apparatus comprising a cylindrical drum having a longitudinal axis; means supporting the drum with its longitudinal axis substantially horizontal; means for feeding materials into the drum to provide therein a damp mass tending to adhere to the inner surface of the drum; a rotor for forming the damp material in the drum into small finely divided free-flowing pellets, said rotor having a longitudinal axis, means supporting the rotor for rotation with its longitudinal axis substantially parallel to the longitudinal axis of the drum, said rotor having a plurality of rows of blades thereon with the blades in each row extending radially to the longitudinal axis of the rotor, each blade being substantially rectangular in transverse section and having opposite parallel flat faces extending parallel to a plane normal to the longitudinal axis of the rotor, the blades in each row being arranged with adjacent faces spaced apart to provide only a narrow space between adjacent blades through which material undergoing formation into pellets passes in engagement with the adjacent blade faces defining said narrow space; and means for cutting material adhering to the drum inner surface from said surface and for delivering said material by gravital fall into said rotor for pellet formation.

15. An apparatus for forming a damp mixture into small finely divided free-flowing pellets; the apparatus comprising a cylindrical drum having a longitudinal axis; means supporting the drum with its longitudinal axis substantially horizontal; means for feeding materials into the drum to provide a damp mass normally adhering to the inner surface of the drum; a rotor for forming the damp material in the drum into small finely divided free-flowing pellets, said rotor having a longitudinal axis, means supporting the rotor for rotation with its longitudinal axis substantially parallel to the longitudinal axis of the drum, said rotor having a plurality of rows of blades thereon with the blades in each row extending radially to the longitudinal axis of the rotor, each blade being substantially rectangular in transverse section and having opposite parallel flat faces extending parallel to a plane normal to the longitudinal axis of the rotor, the blades in each row being arranged with adjacent faces spaced apart to provide only a narrow space between adjacent blades through which material undergoing formation into pellets passes in engagement with the adjacent blade faces defining said narrow space; and means movable relative to the inner surface of the drum for cutting material adhering to the drum inner surface from said surface and for delivering said material by gravital fall into said rotor for pellet formation; the peripheral speed of rotation of the rotor blades being at least several times that of the cutting means relative to the drum inner surface.

16. An apparatus for forming a damp mixture into small finely divided free-flowing pellets, the apparatus comprising a cylindrical drum having a longitudinal axis; means supporting the drum with its longitudinal axis substantially horizontal; means for feeding material into the drum to provide a damp mass normally adhering to the inner surface of the drum; a rotor for forming the damp material in the drum into small finely divided free-flowing pellets, said rotor having a longitudinal axis, means supporting the rotor for rotation with its longitudinal axis substantially parallel to the longitudinal axis of the drum, said rotor having a plurality of rows of radial blades thereon, each blade having opposite parallel flat faces extending parallel to a plane normal to the longitudinal axis of the rotor, the blades being arranged with their respective adjacent faces spaced apart to provide only a narrow space between adjacent blades through which material undergoing formation into pellets passes in engagement with the adjacent blade faces defining said narrow space; and means for cutting material adhering to the drum inner surface from said surface and for delivering said material by gravital fall into the blades on said rotor for pellet formation.

17. A device as in claim 1 wherein the drum has an opening at one end thereof and wherein means are provided for supporting the drum for limited movement between a discharge position wherein the drum axis on the side of the opening extends below the horizontal and a granulating position wherein the drum axis on the side of the opening extends above the horizontal.

References Cited in the file of this patent

UNITED STATES PATENTS

| | | |
|---|---|---|
| 1,428,920 | Sturtevant | Sept. 12, 1922 |
| 1,570,086 | Schaffer | Jan. 19, 1926 |
| 1,980,130 | Fasting | Nov. 6, 1934 |
| 1,994,718 | Lellep | Mar. 19, 1935 |
| 2,120,540 | Billings | June 14, 1938 |
| 2,139,584 | Hunter | Dec. 6, 1938 |
| 2,158,513 | Lloyd | May 16, 1939 |
| 2,287,759 | Hardesty et al. | June 23, 1942 |
| 2,293,439 | Lloyd | Aug. 18, 1942 |
| 2,306,698 | Heller | Dec. 29, 1942 |
| 2,414,701 | Shoeld | Jan. 21, 1947 |
| 2,422,989 | Skoog | June 24, 1947 |
| 2,442,513 | Sackett | June 1, 1948 |
| 2,448,126 | Shoeld | Aug. 31, 1948 |
| 2,543,898 | De Vaney | Mar. 6, 1951 |